United States Patent [19]

Sayles

[11] Patent Number: 5,687,925
[45] Date of Patent: Nov. 18, 1997

[54] SEAT BELT RETRACTOR WITH ENERGY MANAGEMENT

[75] Inventor: Robert D. Sayles, Rochester, Mich.

[73] Assignee: TRW Vehicle Safety Systems Inc., Lyndhurst, Ohio

[21] Appl. No.: 671,531

[22] Filed: Jun. 27, 1996

[51] Int. Cl.⁶ .................................................. B60R 22/28
[52] U.S. Cl. ................................ 242/379.1; 280/805
[58] Field of Search ......................... 242/379.1; 280/805

[56] References Cited

U.S. PATENT DOCUMENTS

| 3,561,690 | 2/1971 | Muskat | 242/379.1 |
|---|---|---|---|
| 3,632,060 | 1/1972 | Balder . | |
| 3,952,967 | 4/1976 | Barile et al. | 280/805 |
| 4,273,361 | 6/1981 | Takei et al. . | |
| 4,322,046 | 3/1982 | Tanaka et al. | 242/379.1 |
| 4,323,205 | 4/1982 | Tsuge et al. . | |
| 5,526,996 | 6/1996 | Ebner et al. | 242/379.1 |
| 5,547,143 | 8/1996 | Miller, III et al. | 242/379.1 |
| 5,558,295 | 9/1996 | Bauer | 242/379.1 |

FOREIGN PATENT DOCUMENTS

| 0 297 537 A2 | 1/1989 | European Pat. Off. | 280/805 |
|---|---|---|---|
| 2 336 148 | 7/1977 | France | 242/379.1 |
| 1 913 448 | 9/1970 | Germany | 280/805 |
| 27 57 605 | 6/1979 | Germany | 280/805 |
| 43 24 967 A1 | 1/1995 | Germany | 280/805 |
| 888210 | 1/1962 | United Kingdom | 280/805 |
| 1 324 667 | 7/1973 | United Kingdom | 280/805 |

Primary Examiner—John P. Darling
Attorney, Agent, or Firm—Tarolli, Sundheim, Covell, Tummino & Szabo

[57] ABSTRACT

A seat belt webbing retractor (10) includes a spool assembly (60) around which seat belt webbing (16) is wound. The spool assembly (60) is rotatable in webbing withdrawal and webbing retraction directions (A,B). A member, such as a ratchet wheel, (70) is rotatable in the withdrawal and retraction directions (A,B) with the spool assembly (60). A lock pawl, (190) is engageable with the rotatable member (70) for blocking rotation of the rotatable member (70) and the spool assembly (60) in the withdrawal direction (A). The spool assembly (60) is rotatable relative to the rotatable member (70) upon the occurrence of a tension above a predetermined amount in the webbing (16). A deformable member (78) is plastically deformed to absorb energy during rotation of the spool assembly (60) relative to the rotatable member (70). A hub (112) and a ring (140), are also rotatable upon rotation of the spool assembly (60) relative to the rotatable member (70). The deformable member (78) has a plurality of annular projections (94, 102), and the hub and ring (112, 140) deform the projections to absorb energy.

21 Claims, 5 Drawing Sheets

SEAT BELT RETRACTOR WITH ENERGY MANAGEMENT

BACKGROUND OF THE INVENTION

A known seat belt system for restraining an occupant of a vehicle includes seat belt webbing, a seat belt buckle, and a webbing retractor. A tongue is connected to the webbing and is releasably lockable in the buckle when the webbing is extended across the vehicle occupant. The retractor includes a spool upon which the webbing is wound. The spool rotates in a webbing withdrawal direction when the vehicle occupant extracts the webbing from the retractor. A rewind spring in the retractor rotates the spool in a webbing retraction direction to retract the webbing into the retractor.

When the vehicle experiences sudden deceleration, a vehicle occupant using the seat belt system applies a force against the webbing. The force which is applied to the webbing urges the spool to rotate in the withdrawal direction. The retractor includes a blocking mechanism which blocks rotation of the spool in the withdrawal direction in response to sudden vehicle deceleration. Thus, the blocking mechanism prevents further withdrawal of the webbing from the retractor, and the webbing restrains forward movement of the vehicle occupant.

SUMMARY OF THE INVENTION

The present invention relates to a vehicle seat belt webbing retractor. The retractor has a spool around which seat belt webbing is wound. The spool is rotatable about an axis in webbing withdrawal and webbing retraction directions. A member is rotatable in the withdrawal and retraction directions. A means blocks rotation of the rotatable member and the spool in the withdrawal direction. The spool is rotatable relative to the rotatable member upon an occurrence of a tension in the webbing above a predetermined amount. A deformable member absorbs energy during rotation of the spool relative to the rotatable member. A means deforms the deformable member during rotation of the spool relative to the rotatable member.

Preferably, the deformable member has a plurality of annular projections and the means for deforming deforms the annular projections. The energy absorption occurs during a plurality of rotations of the spool relative to the rotatable member, and at least one of the projections is deformed during each rotation of the spool relative to the rotatable member. The deformable member is fixed for rotation with the rotatable member, and the projections are concentric about the axis. The means for deforming includes a plurality of deformation members which are rotatable about the axis relative to the deformable member to deform the projections. One deformation member is fixed to rotate with the spool.

BRIEF DESCRIPTION OF THE DRAWINGS

Further features of the present invention will become apparent to those skilled in the art to which the present invention relates from reading the following specification with reference to the accompanying drawings, in which:

FIG. 5A is a fragmentary view taken along line 5A—5A of FIG. 5;

DESCRIPTION OF PREFERRED EMBODIMENTS

Figure 1:
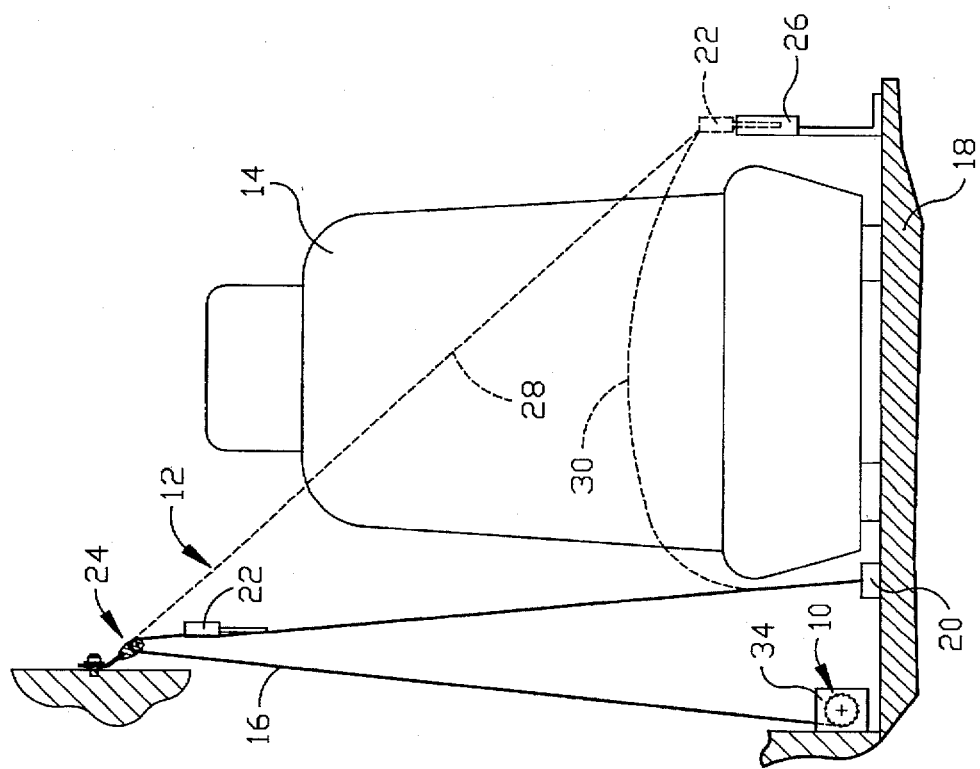
FIG. 1 is a schematic illustration of a seat belt webbing restraint system which includes a retractor according to the present invention.

The present invention relates to a retractor for a seat belt webbing restraint system. The present invention is applicable to various retractor constructions and is also applicable to various webbing restraint system configurations. As representative of such constructions and configurations, a retractor 10 in a seat belt webbing restraint system 12 is illustrated in FIG. 1.

During operation of a vehicle, an occupant (not shown) of the vehicle sits on a seat 14 which is illustrated as a front passenger seat in a vehicle. A length of seat belt webbing 16 is extensible about the vehicle occupant. One end of the length of webbing 16 is anchored to the vehicle body 18 at an anchor point 20 located on one side of the seat 14. The opposite end of the webbing 16 is attached to the retractor 10, which is secured to the vehicle body 18 on the same side of the seat as the anchor point 20. Intermediate its ends, the webbing 16 passes through a tongue assembly 22 and a D-ring 24 that is located above both the retractor 10 and the anchor point 20. When the seat belt webbing restraint system 12 is not in use, a portion of the webbing 16 is wound on the retractor 10 and the remainder is oriented generally vertically on the one side of the seat 14, as is shown in solid lines in FIG. 1.

To engage the seat belt webbing restraint system 12, the tongue assembly 22 is manually grasped and pulled across the lap and torso of the occupant sitting on the seat 14. As the tongue assembly 22 is pulled across the lap and torso of the occupant, the tongue assembly moves along the webbing 16 and the webbing is unwound from the retractor 10. When the webbing 16 has been pulled across the lap and torso of the occupant, the tongue assembly 22 is connected with a buckle 26 as shown in dashed lines in FIG. 1. The buckle 26 is connected to the vehicle body 18 and is disposed upon the side of the seat 14 opposite the anchor point 20. When the seat belt webbing restraint system 12 is thus buckled, the length of webbing 16 is divided by the tongue assembly 22 into a torso portion 28 which extends across the torso of the occupant and a lap portion 30 which extends across the lap of the occupant.

Figure 2:
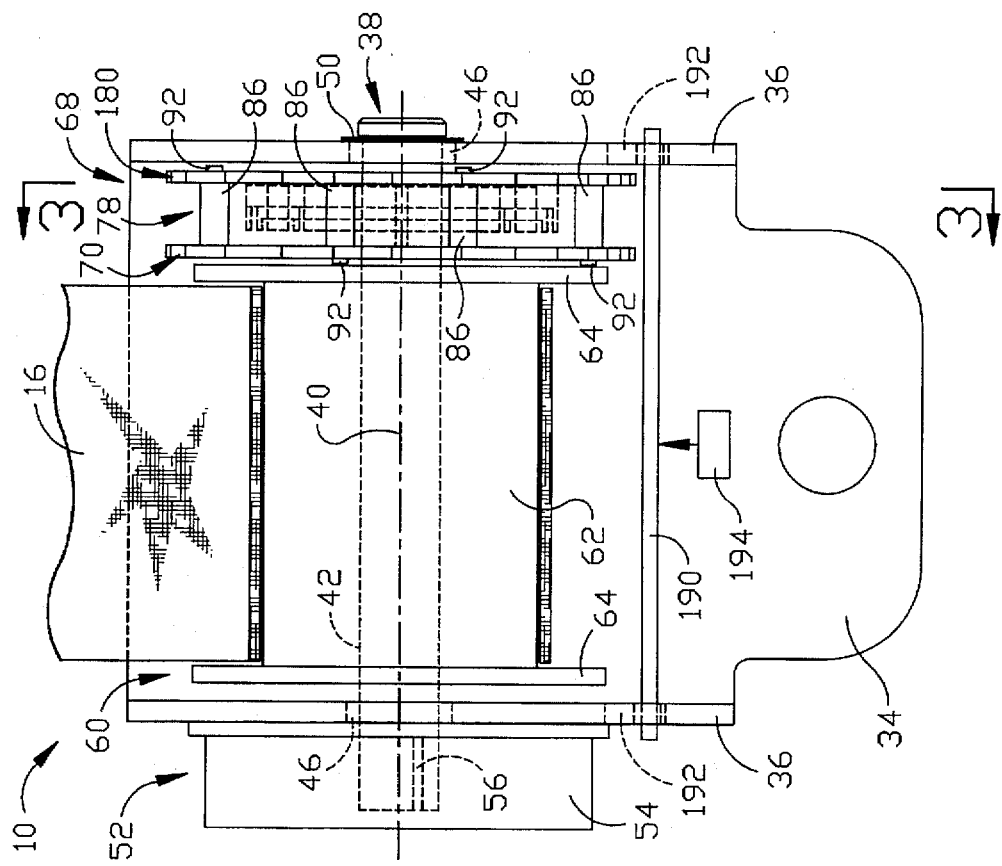
FIG. 2 is a view of the retractor shown in FIG. 1.
Figure 3:
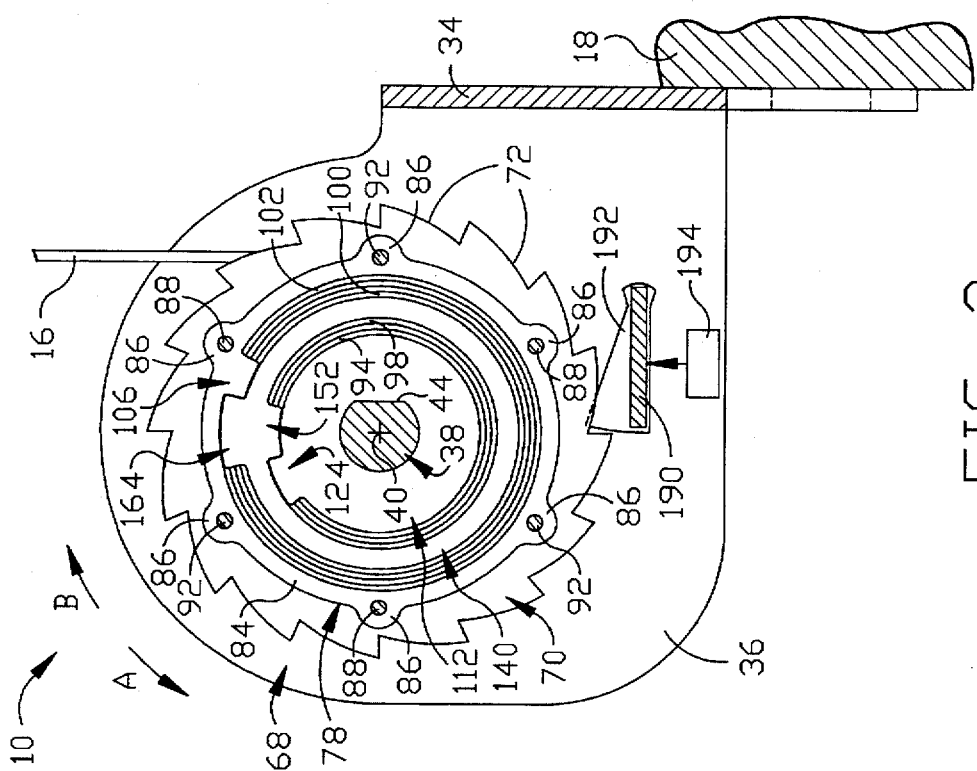
FIG. 3 is a view taken along line 3—3 in FIG. 2.

The retractor 10 includes a metal frame 34 which is adapted to be mounted to a portion of the vehicle body 18. The frame 34 (FIG. 2) is generally U-shaped and has a pair of opposed sides 36. A metal shaft 38 of the retractor 10 extends along an axis 40. The shaft 38 has a main portion 42 with a flat 44 (FIG. 3).

Two bushings 46 (FIG. 2) are made of a suitable material, such as plastic, and are fitted into respective sides 36 of the frame 34. The bushings 46 receive segments of the shaft 38. The bushings 46, and thus the frame 34, support the shaft 38 for rotation about the axis 40. The shaft 38 is rotatable about the axis 40 relative to the frame 34 in two directions A and B (FIG. 3), which are designated webbing withdrawal and webbing retraction directions, respectively.

An annular groove 48 (FIG. 4) extends into the shaft 38 adjacent to one end of the shaft. The annular groove 48 provides a location for receiving a retainer 50 (FIG. 2) to prevent axial movement of the shaft 38 relative to the frame 34. Another retainer (not shown) may be provided adjacent to the other end of the shaft 38, also to prevent axial movement of the shaft relative to the frame 34.

The shaft 38 is biased to rotate in the retraction direction B (FIG. 3) by a drive assembly 52 (FIG. 2) of the retractor 10. The drive assembly 52 may have any suitable construction. Preferably, the drive assembly 52 includes a housing 54, which encloses an end portion of the shaft 38, and a coil spring (not shown). The spring is connected between the housing 54 and the shaft 38, and extends into a slot 56 in the shaft 38.

A spool assembly 60 of the retractor 10 is located on the main portion 42 of the shaft 38. The spool assembly 60 includes a sleeve 62 which is made of a suitable material, such as metal. The sleeve 62 is concentric about the shaft 38, and has a slot (not shown) which extends parallel to the axis 40 and through the sleeve into the interior of the sleeve. The spool assembly 60 includes two disks 64. The disks 64 are preferably metal, but could be made of other suitable material. Each disk 64 is a circular plate which has a smooth radially outer periphery. Each disk 64 has a center hole (not shown), and the center hole of at least one of the disks is D-shaped. Preferably, the right-most (as viewed in FIG. 2) disk 64 has a D-shaped center hole.

The two disks 64 are located on opposite axial sides of the sleeve 62. The disks 64 are fixed to the sleeve 62 by suitable means such as staking or fasteners (not shown). The shaft 38 extends through the center openings of the disks 64. The main portion 42 with its flat 44 fits snugly into the D-shaped center opening of the one disk 64, and the one disk is fixed for rotation with the shaft. Accordingly, the entire spool assembly 60, including the sleeve 62, is fixed for rotation with the shaft 38.

An end of the webbing 16 is suitably secured to the spool assembly 60. Preferably, the end of the webbing 16 extends through the slot in the sleeve 62 and is sewn into a loop (not shown) about the shaft 38. The webbing 16 extends from the slot of the sleeve 62 and is wrapped to form coils (shown in section) around the sleeve.

When the webbing 16 is pulled from the spool assembly 60 by the vehicle occupant, the spool assembly is rotated in the withdrawal direction A (FIG. 3) against the bias of the drive assembly 52. When the webbing 16 is released from its secured position across the vehicle occupant, the spring of the drive assembly 52 rotates the shaft 38 and the spool assembly 60 in the retraction direction B and the webbing 16 is coiled back on the sleeve 62, as will be understood by those skilled in the art.

The retractor 10 includes a stacked assembly 68 (FIG. 2), which is located on the main portion 42 of the shaft 38 between one side 36 of the frame 34 and the spool assembly 60. The stacked assembly 68 includes a first ratchet wheel 70, which is made of suitable material such as metal. The first ratchet wheel 70 has a plurality of teeth 72 (FIG. 4) located in an annular array about its radially outer periphery. Each tooth 72 has a radially extending abutment face and an intersecting sloped face. A circular center hole 74 extends through the first ratchet wheel 70 and is centered on the axis 40. The center hole 74 has a diameter which is slightly larger than the cylindrical diameter of the main portion 42 of the shaft 38. The shaft 38 extends through the center hole 74 of the first ratchet wheel 70 and the first ratchet wheel is rotatable about the axis 40 relative to the shaft.

A housing 78 of the stacked assembly 68 is coaxial on the axis 40. The housing 78 may be made of any suitable material, such as metal. A plate portion 80 (FIG. 5) of the housing 78 extends perpendicular to the axis 40. A circular center hole 82 extends through the plate portion 80 and is centered on the axis 40. The center hole 82 has a diameter which is slightly larger than the cylindrical diameter of the main portion 42 of the shaft 38. The shaft 38 extends through the center hole 82 of the plate portion 80 and the housing 78 is rotatable about the axis 40 relative to the shaft.

The housing 78 has an annular outer wall 84 which is located at a radially outer peripheral extent of the plate portion 80. The outer wall 84 extends around the axis 40 and extends in an axial direction away from the plate portion 80. The housing 78 is open at its axial end opposite to the plate portion 80 and, accordingly, the housing has a general cup shape.

Six mounting lobes 86 (FIG. 4) are located on the outer side of the outer wall 84 and are spaced from each other about the outer periphery of the housing 78. All six mounting lobes 86 have axially extending projections 88. Three of the mounting lobes 86 have projections 88 (only two shown in FIG. 5) which extend in an axial direction toward the first ratchet wheel 70. The three projections 88 extend through three of six holes 90 (FIG. 4) in the first ratchet wheel 70. The other three mounting lobes 86 are aligned with the other three holes 90 in the first ratchet wheel 70 and three fasteners 92 (only two shown) extend through the three holes and into the lobes. The fasteners 92 may be any suitable fasteners such as staking elements. The first ratchet wheel 70 and the housing 78 are thus rotationally and axially fixed together.

The housing 78 has a plurality of annular projections which extend around the axis 40 and in an axial direction from the plate portion 80. The annular projections are located radially within the outer wall 84 and are concentric about the axis 40. A first annular projection 94 (FIG. 5) extends in the axial direction from the plate portion 80 a length L1. A cylindrical inner surface of the annular projection 94 is located at a radius R1 from the axis 40. The annular projection 94 has a wall thickness of W1, as measured between its inner and outer surfaces along a radial direction.

A notch 96 is defined in the annular projection 94 and the notch faces radially inward. The notch 96 has a suitable shape, which is preferably a partial cylinder (best shown in FIG. 4). The notch 96 is defined by an arcuate surface which is concave toward the axis 40 and which extends along the axis, and a flat surface which is perpendicular to the axis. The arcuate surface of the notch 96 extends completely, or almost completely, through the annular projection 94 in a radial direction (best shown in FIG. 5A) and along approximately half of the axial length of the annular projection 94 (best shown in FIG. 5) from the edge of the annular projection located away from the plate portion 80. When viewing FIGS. 4 or 5A, the notch 96 is located at approximately an eleven o'clock position.

Located just radially outward of the annular projection 94 is an annular projection 98. The annular projection 98 extends from the plate portion 80 for an axial length L2 (FIG. 5), which is less than the axial length L1. Accordingly, within the housing 78, the annular projection 98 is recessed with respect to the annular projection 94. A cylindrical outer surface of the annular projection 98 is located at a radius R2 from the axis 40.

An annular projection 100 is located radially outward of the annular projection 98. The annular projection 100 has an axial length of L2 from the plate portion 80. A cylindrical inner surface of the annular projection 100 is located at a radius R3 from the axis 40. The annular projection 100 is spaced from the annular projection 98 to define a channel 101 (best shown in FIG. 5A).

Located just radially outward of the annular projection 100 and adjacent to the outer wall 84 is an annular projection 102. A cylindrical inner surface of the annular projection 102 is located at a radius R4 (FIG. 5) from the axis 40. The annular projection 102 has an axial length of L1 and has a wall thickness W2. In a preferred embodiment, the wall thickness W2 is equal to W1. However, the thicknesses W1 and W2 may be different.

A notch 104 is defined in the annular projection 102. The notch 104 may have any suitable shape and preferably has the same shape as the notch 96. The notch 104 extends completely, or almost completely, through the annular projection 102 in a radial direction from the axis 40 (best shown in FIG. 5A) and along approximately half of the axial length of the annular projection 102 (best shown in FIG. 5). When viewing FIGS. 4 or 5A, the notch 104 is located at approximately a twelve o'clock position.

A stop lobe 106 (FIG. 4) on the housing 78 extends radially inward from the outer wall 84. A radially innermost surface 107 (FIG. 5A) on the stop lobe 106 is arcuate and is located at a radial distance from the axis 40 slightly greater than R3. Surfaces 108 and 109 define the sides of the stop lobe 106. The stop lobe 106 is adjacent to the notch 104 and the surface 109 faces the notch. When viewing FIG. 5A, the stop lobe 106 is generally at the one o'clock position.

Figure 4:
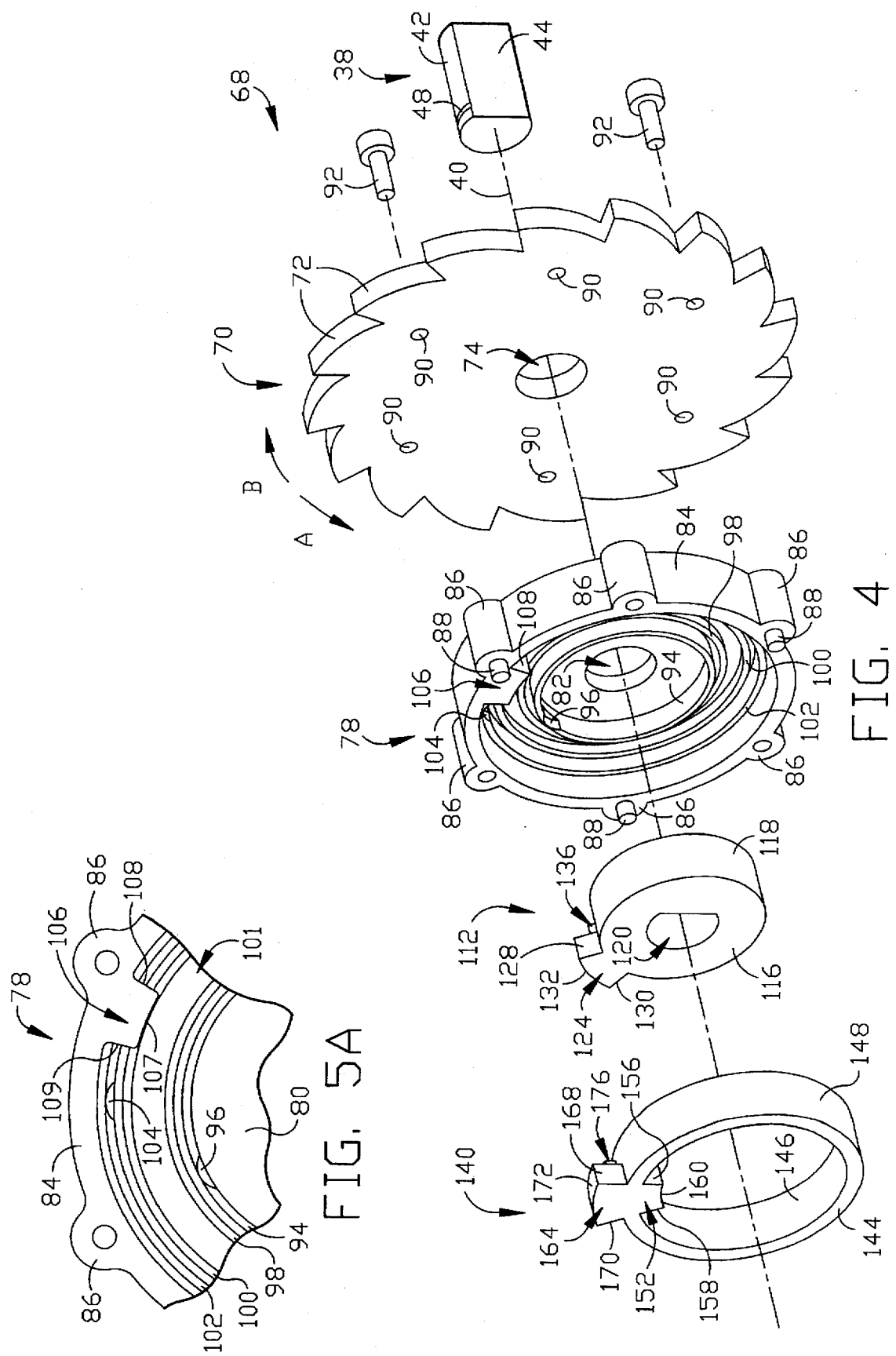
FIG. 4 is an exploded view of certain parts of the retractor of FIG. 2.
Figure 5:
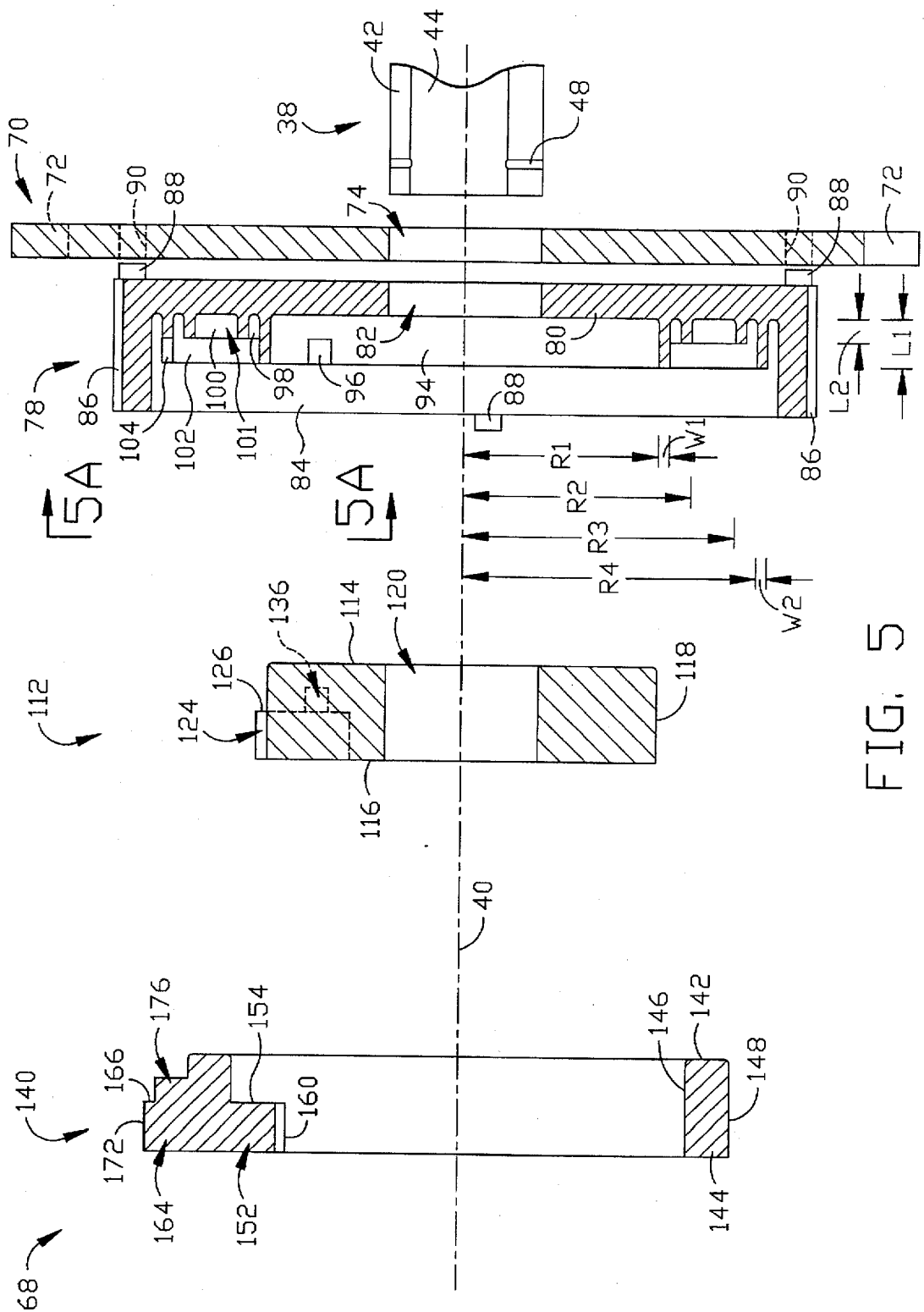
FIG. 5 is an enlarged, section view of the parts shown in FIG. 4.

A hub 112 (FIG. 4) of the stacked assembly 68 is coaxial with the axis 40. The hub 112 may be made of any suitable material, such as metal. The material of the hub 112 is harder than the material of the housing 78. The hub 112 has two planar surfaces 114 and 116 (FIG. 5) which lie perpendicular to the axis 40. A D-shaped center hole 120 (best shown in FIG. 4) extends through the hub 112 and is centered on the axis 40. The center hole 120 of the hub 112 has a cylindrical diameter such that the main portion 42 of the shaft 38 fits snugly into the center hole 120. Accordingly, the hub 112 is fixed for rotation with the shaft 38. A cylindrical outer surface 118 of the hub 112 has a radius which is slightly less than the radius R1 (FIG. 5). The hub 112 fits radially within the annular projection 94 of the housing 78 (best shown in FIG. 3), with the surface 114 resting against the plate portion 80 (FIG. 5) and the surface 116 recessed slightly below the edge of the outer wall 84.

The hub 112 has a stop lobe 124 which extends radially out from the outer surface 118. One axial side of the stop lobe 124 is flush with the surface 116. The other axial side of the stop lobe 124 is bounded by a surface 126. The surface 126 is located at an axial distance slightly greater than L1 away from the surface 114. An outermost radial extent of the stop lobe 124 is bounded by an arcuate surface 132 (FIG. 4). The surface 132 is located at a radius from the axis 40 which is slightly less than the radius R2 and the stop lobe 124 axially overlies a portion of the annular projection 94. Surfaces 128 and 130 define the sides of the stop lobe 124.

Located adjacent to the stop lobe 124 is a deformation lobe 136. The deformation lobe 136 extends in an axial direction from the stop lobe 124 toward the surface 114 (best shown in FIG. 5). The deformation lobe 136 also extends radially outward from the outer surface 118 (best shown in FIG. 4). The deformation lobe 136 has a shape which is congruent with the shape of the notch 96 on the annular projection 94. Accordingly, the shape of the deformation lobe 136 is preferably a partial cylinder. An arcuate surface of the deformation lobe 136 is convex relative to the axis 40. A greatest radial distance of the deformation lobe 136 from the axis 40 is slightly greater than the radius R1. The axial length of the deformation lobe 136 is slightly less than the axial length of the notch 96 (best shown in FIG. 5). The deformation lobe 136 is located within the notch 96 on the annular projection 94.

A ring 140 of the stacked assembly 68 is coaxial with the axis 40. The ring 140 may be made of any suitable material such as metal. The material of the ring 140 has a hardness greater than the material of the housing 78. The ring 140 has two planar surfaces 142 and 144 which lie perpendicular to the axis 40. A cylindrical inner surface 146 extends between the surfaces 142 and 144, and is located at a radius from the axis 40 which is slightly greater than R2. A cylindrical outer surface 148 extends between the surfaces 142 and 144 and lies at a radius slightly less than R3. The ring 140 fits between the annular projections 98 and 100 and, thus, rests in the channel 101 with the surface 142 engaging the plate portion 80 and the surface 144 recessed slightly below the edge of the outer wall 84.

The ring 140 has an inner stop lobe 152. One axial side of the inner stop lobe 152 is flush with the surface 144. The other axial side of the inner stop lobe 152 is bounded by a surface 154. The axial distance between the surface 142 and the surface 154 is slightly greater than L1. A radially innermost surface 160 of the inner stop lobe 152 is arcuate and is located at a radius slightly greater than R1 and the inner stop lobe axially overlies a portion of the annular projection 94. Surfaces 156 and 158 (FIG. 4) define the sides of the inner stop lobe 152. As shown in FIG. 3, the inner stop lobe 152 of the ring 140 is adjacent to the stop lobe 124 of the hub 112. The surface 158 (FIG. 4) faces the surface 128.

The ring 140 has an outer stop lobe 164. One axial side of the outer stop lobe 164 is flush with the surface 144 and the other axial side of the outer stop lobe 164 is bounded by a surface 166 (FIG. 5). The surface 166 is coplanar with the surface 154. A radially outermost extent of the outer stop lobe 164 is bounded by a surface 172 which lies in an arc extending at a radius from the axis 40 which is greater than R4. The outer stop lobe 164 axially overlies a portion of the annular projection 102. Surfaces 168 and 170 (FIG. 4) define the sides of the outer stop lobe 164. As shown in FIG. 3, the outer stop lobe 164 is adjacent to the stop lobe 106 on the housing 78. The surface 168 (FIG. 4) faces the surface 109 (FIG. 5A).

A deformation lobe 176 (FIG. 4) of the ring 140 is located adjacent to the outer stop lobe 164. The deformation lobe 176 is similar to the deformation lobe 136. Also, the deformation lobe 176 has a shape which is congruent with the shape of the notch 104. Accordingly, the shape of the deformation lobe 176 is preferably a partial cylinder with an arcuate surface that is convex relative to the axis 40. A greatest radial extent of the deformation lobe 176 from the axis 40 is slightly greater than the radius R4. The axial length of the deformation lobe 176 (FIG. 5) is slightly less than the axial length of the notch 104 on the housing 78. The deformation lobe 176 is located within the notch 104.

A second ratchet wheel 180 (FIG. 2) of the stacked assembly 68 is coaxial with the axis 40 and is parallel to the first ratchet wheel 70. The second ratchet wheel 180 has a center hole (not shown) that is identical to the center hole 74 of the first ratchet wheel 70 and has a plurality of teeth that are identical to the teeth 72 of the first ratchet wheel. The teeth of the second ratchet wheel overlie the teeth 72 of the first ratchet wheel 70 in an axial direction. Also, the second ratchet wheel 180 has a plurality of holes (not shown) that are identical to the holes 90 of the first ratchet wheel 70. The projections 88 on three of the mounting lobes 86 extend through three of the openings and three fasteners 92 (only two shown) extend through the other three openings. Accordingly, the second ratchet wheel 180 is fixed to the housing 78 similar to the first ratchet wheel 70. The hub 112 and the ring 140 (shown only in phantom in FIG. 2) are axially trapped within the housing 78 by the second ratchet wheel 180.

Figure 6:
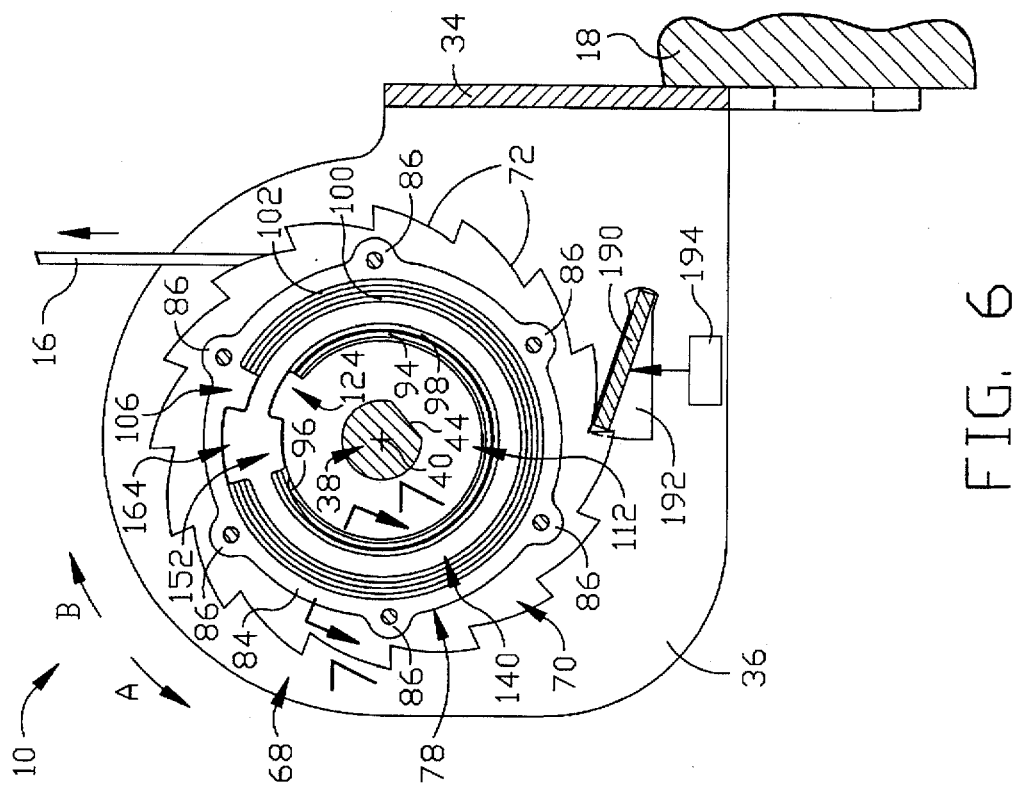
FIG. 6 is a view similar to FIG. 3, but with certain parts in a different position.

The retractor 10 has a lock pawl 190 which is made of a suitable material such as metal. The lock pawl 190 extends between the sides 36 of the frame 34. The ends of the lock pawl 190 adjacent the sides 36 of the frame 34 extend into openings 192 in the sides 36. The openings 192 are shaped to permit pivoting of the lock pawl 190. The lock pawl 190 is pivotable (as shown in FIG. 6) to engage the teeth of the ratchet wheels 70, 180 (the second ratchet wheel 180 has been removed in FIG. 6).

An actuator 194 (schematically shown) of the retractor 10 is located adjacent to the lock pawl 190. The actuator 194 is a mechanism for causing the lock pawl 190 to pivot. The actuator 194 may be any suitable mechanism. For example, the actuator 194 may be a mechanical inertia-sensitive device which pushes upward on the lock pawl 190 in response to a sudden change in vehicle velocity which exceeds a predetermined change in velocity, such as occurs during a vehicle collision. Alternatively, the actuator 194 may be an electro-mechanical device which causes the lock pawl 190 to pivot in response to an electrical signal provided by a sensor mechanism (not shown). The sensor mechanism detects a condition indicative of vehicle deceleration above a predetermined deceleration such as occurs in a collision. Accordingly, the actuator 194 causes the lock pawl 190 to pivot in response to a condition which is indicative of a collision of the vehicle.

When a vehicle occupant (not shown) pulls the webbing 16 (FIG. 1) across his or her torso to secure the webbing, the webbing causes the spool assembly 60 (FIG. 2) to rotate in the withdrawal direction A (FIG. 3). The shaft 38 (FIG. 2) rotates with the spool assembly 60, against the bias provided by the drive assembly 52. In addition, the hub 112 (FIG. 3) is rotated with the shaft 38. During this rotation of the hub 112, the housing 78 and the affixed ratchet wheels 70, 180 (only the first ratchet wheel 70 is shown in FIG. 3) rotate with the hub such that the stacked assembly 68 rotates as a unit.

The rotation of the stacked assembly 68 as a unit is the result of the deformation lobe 136 (FIG. 4) resting in the notch 96 on the annular projection 94. The deformation lobe 136 is entrapped by the adjacent material of the annular projection 94. When the hub 112 rotates, the rotational force is transmitted by the deformation lobe 136 to the housing 78. The ring 140 rotates with the housing 78 because its deformation lobe 176 is resting in the notch 104. The deformation lobe 176 is entrapped by the adjacent material of the annular projection 102.

When the vehicle is stopped and the vehicle occupant is preparing to leave the vehicle, the webbing 16 (FIG. 3) is released from across the vehicle occupant and the drive assembly 52 biases the shaft 38 to rotate in the retraction direction B. The spool assembly 60 is rotated with the shaft 38 in the retraction direction B such that the webbing 16 is coiled back onto the spool assembly 60. In addition, the stacked assembly 68 also rotates as a unit. Specifically, there is no relative rotation between the hub 112 and the housing 78.

During use of the vehicle with webbing 16 secured across the vehicle occupant, a collision may occur. During the collision, the vehicle will suddenly decelerate. In response to a condition indicative of the collision, the actuator 194 causes the lock pawl 190 to pivot upward (as shown in FIG. 6) and engage the abutment faces of the teeth of the ratchet wheels 70, 180. The ratchet wheels 70, 180 are blocked and prevented from further rotation in the withdrawal direction A.

The vehicle occupant presses upon the webbing 16 because the vehicle occupant tends to move relative to the vehicle during the collision due to inertia. The tension force in the webbing 16 is increased. The tension force is transmitted to the spool assembly 60 and urges the spool assembly and the shaft 38 to rotate in the withdrawal direction A. A rotational force is transmitted from the spool assembly 60 through the shaft 38 to the hub 112. This rotational force causes the deformation lobe 136 to bear upon the material of the annular projection 94 adjacent to the notch 96. Initially, the material of the annular projection 94 does not yield and rotation of the hub 112 relative to the housing 78 is prevented in the withdrawal direction A. Accordingly, the shaft 38 and the spool assembly 60 are initially held stationary and the amount of webbing 16 which extends across the vehicle occupant is momentarily fixed. As the tension in the webbing increases, the deformation lobe 136 presses against the material of the annular projection 94 adjacent to the notch 96 with an increasing force.

Figure 7:
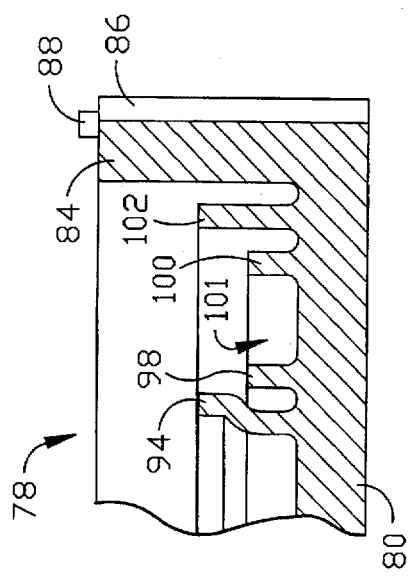
FIG. 7 is an enlarged, fragmentary view taken along line 7—7 in FIG. 6, with certain parts removed.

A pressing force from the deformation lobe 136 above a predetermined amount causes the material of the annular projection 94 adjacent to the notch 96 to deform or bend radially outward such that the hub 112 may rotate (counterclockwise as viewed in FIG. 6) and move the deformation lobe 136 in an arc about the axis 40 from an initial position at the notch 96. Specifically, the annular projection 94 undergoes plastic deformation (FIG. 7, the hub 112 and the ring 140 have been removed for clarity) and a portion of the annular projection 94 which is located axially away from the plate portion 80 is displaced radially outward by the deformation lobe 136. There is resistance to the rotation of the hub 112 because of the resistance of the annular projection 94 to deformation. Further, energy is absorbed by the housing 78 upon its deformation.

As the hub 112 rotates, the surface 114 (FIG. 5) can rotationally slide on the plate portion 80 and the outer surface 118 can slide inside the annular projection 94. Also, the stop lobe 124 moves in an arc about the axis 40 and can slide over the axial end of the annular projection 94. Initially, the stop lobe 124 moves (from a position at eleven o'clock as viewed in FIG. 3) away from the inner stop lobe 152 on the ring 140. As the hub 112 nears completion of a first revolution about the axis 40 (FIG. 6), the stop lobe 124 is moved toward the inner stop lobe 152. The surface 130 (FIG. 4) engages the surface 156 of the inner stop lobe 152 (when the stop lobe 124 is at a one o'clock position, as viewed in FIG. 6).

The hub 112 can now drive the ring 140 to rotate (counterclockwise as viewed in FIG. 6) relative to the stationary housing 78. The deformation lobe 176 (FIG. 4) on the ring 140 bears upon the material of the annular projection 102 adjacent to the notch 104. Also, at this point in the rotation of the hub 112, the deformation lobe 136 is still bearing upon a segment of the annular projection 94 which has not yet been deformed.

Figure 9:
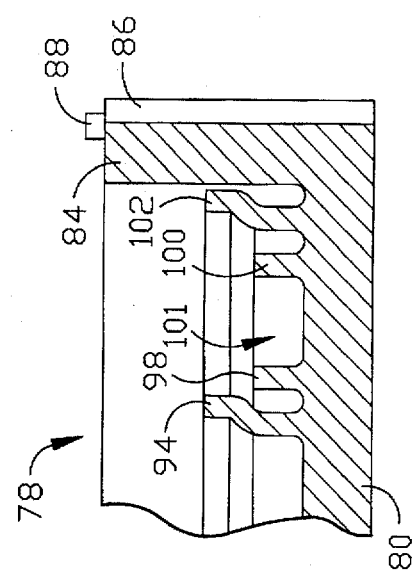
FIG. 9 is an enlarged, fragmentary view taken along line 9—9 in FIG. 8, with certain parts removed.

If the rotational force urging the hub 112 is above a predetermined amount, the hub continues to rotate, the deformation lobe 136 continues to deform the annular projection 94 and the deformation lobe 176 begins to deform (bend) the annular projection 102. The deformation of the annular projection 102 by the deformation lobe 176 is similar to the deformation of the annular projection 94 by the deformation lobe 136. Specifically, the deformation lobe 176 causes plastic deformation of the annular projection 102 such that a portion of the annular projection 102 is displaced radially outward (FIG. 9, the hub 112 and the ring 140 have been removed for clarity). As the ring 140 (FIG. 5) rotates, the ring rotationally slides along the channel 101, and the stop lobes 152, 164 can slide over the axial ends of the annular projections 94 and 102, respectively. Also, the outer stop lobe 164 is moved away from the stop lobe 106 of the housing 78. An additional amount of energy is absorbed by the housing 78 during deformation of the annular projection 102. An increased amount of rotational force is required to continue rotation at this point because resistance to rotation is provided by both annular projections 94 and 102.

Figure 8:
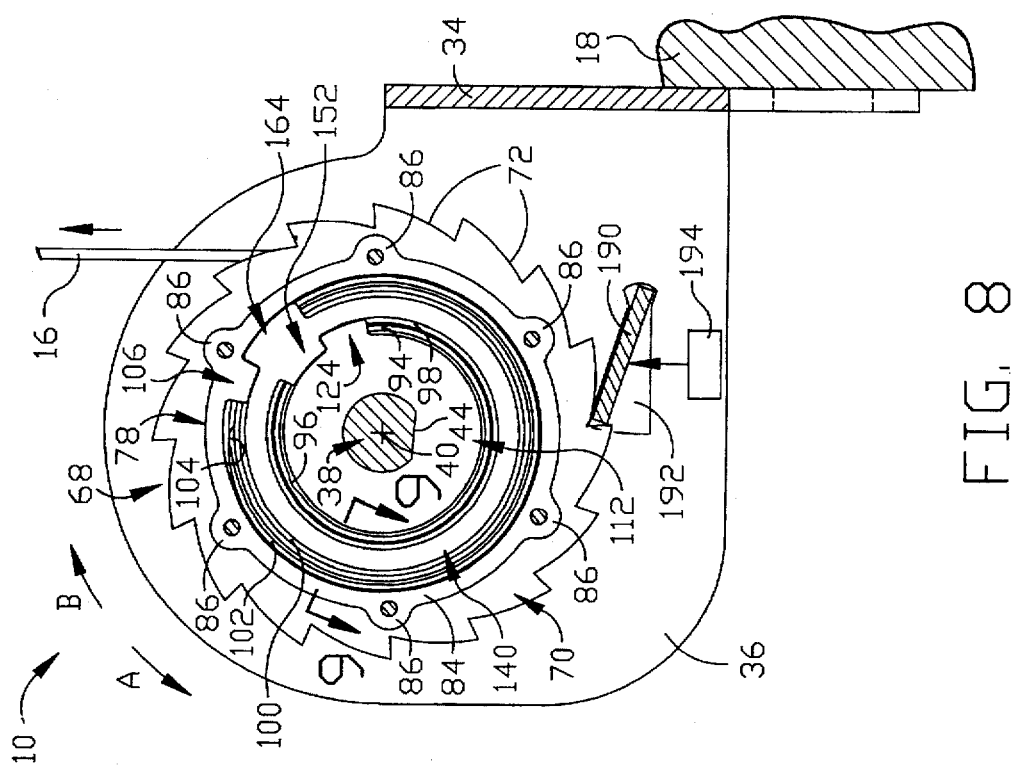
FIG. 8 is a view similar to FIG. 6, but with certain parts in a different position.

As the hub 112 completes its initial revolution relative to the housing 78, the deformation lobe 136 passes to the portion of the annular projection 94 which was previously deformed during the initial revolution. However, resistance to rotation of the hub 112 and the ring 140 is still present because of the resistance of the annular projection 102 to deformation by the deformation lobe 176. As the hub 112 and ring 140 approach completion of their joint revolution (FIG. 8, second revolution of the hub 112), the outer stop lobe 164 approaches the stop lobe 106. When the surface 170 (FIG. 4) engages the surface 108, rotation of the ring 140 is arrested. Also, the rotation of the hub 112 is arrested because the stop lobe 124 of the hub rests upon the inner stop lobe 152 of the ring 140. Accordingly, the hub 112, and thus the shaft 38 and the spool assembly 60, are permitted to rotate approximately two revolutions.

During the permitted rotation of the hub 112 in the withdrawal direction A, the shaft 38 and the spool assembly 60 rotate with the hub relative to the stationary ratchet wheels 70, 180 and housing 78. During rotation of the spool assembly 60 in the withdrawal direction A, an amount of webbing 16 is uncoiled from the spool assembly 60 under the tension which is created in the webbing by the vehicle occupant, and the vehicle occupant is permitted to move forward some amount. Preferably, the retractor 10 is used in conjunction with an inflatable occupant restraint commonly known as an air bag. The occupant moves into the inflated air bag as the annular projections 94, 102 are deformed.

The deformation of the annular projection 94, and subsequently the deformation of the annular projection 102, is not instantaneous but instead occurs over a period of time. During this time period, the webbing 16 does not fully block forward movement of the vehicle occupant. Occupant deceleration resulting from engagement with the webbing 16 occurs over a longer period of time than it would if the webbing 16 were connected to a spool sleeve fixed to stationary ratchet wheels. In addition, the deformation of the annular projections 94, 102 of the housing 78 reduces the webbing restraining force acting on the vehicle occupant. Thus, the work required to restrain the occupant is applied over a longer period of time, reducing the peak restraining load.

The principle for conservation of energy states that the total occupant kinetic crash energy is $\frac{1}{2}M(V_i^2-V_f^2)^2$, where M is the occupant's mass, $V_i$ is the velocity of the vehicle occupant at the beginning of the crash and $V_f$ is the velocity of the vehicle occupant at the end of the crash. The total occupant crash energy is dissipated by performing work on the vehicle occupant. Work, which is a force applied over a distance, must be performed on a vehicle occupant to stop the occupant's motion. During a collision, work is performed on a vehicle occupant by a variety of means, including physical absorption by the occupant, interaction between the occupant and the vehicle seat, and interaction between the occupant and the webbing 16. Kinetic energy of the moving occupant is absorbed and dissipated during the deformation of the annular projections 94, 102.

The amount of energy which is absorbed during the rotation of the hub 112 and the deformation of the annular projections 94, 102 results in an energy absorption performance profile. The performance profile can be changed by modifying the annular projections 94, 102. Specifically, the width W1 of the annular projection 94 can be varied such that the amount of energy dissipated during the first revolution of the hub 112 is varied. For example, increasing the width W1 will result in a greater amount of energy absorption per amount of rotation. Similarly, the width W2 of the annular projection 102 can be varied to vary the energy absorption during the second revolution of the hub 112.

From the above description of the present invention, those skilled in the art will perceive improvements, changes and modifications. Such improvements, changes and modifications, within the skill of the art, are intended to be covered by the appended claims.

Having described the invention, the following is claimed:

1. A seat belt webbing retractor comprising:

a spool around which seat belt webbing is wound, said spool being rotatable about an axis in webbing withdrawal and webbing retraction directions;

a member rotatable in the withdrawal and retraction directions;

means for blocking rotation of said rotatable member and said spool in the withdrawal direction, said spool being rotatable relative to said rotatable member upon the occurrence of tension in the webbing above a predetermined amount;

a deformable member for absorbing energy during a plurality of rotations of said spool relative to said rotatable member, said deformable member having a plurality of annular projections which are concentric about the axis; and a plurality of deformation members rotatable relative to said deformable member about the axis for deforming said projections of said deformable member during rotation of said spool relative to said rotatable member to absorb energy.

2. A retractor as set forth in claim 1, wherein said deformation members have portions adjacent to said projections and deformation lobes extending radially outward from said portions adjacent to said projections, said deformation lobes deforming said projections radially outward during rotation of said deformation members relative to said deformable member.

3. A retractor as set forth in claim 1, wherein said deformation members and said deformable member have means for blocking further rotation of said deformable members relative to said deformable member subsequent to rotation of said deformable members relative to said deformable member and deformation of said projections.

4. A retractor as set forth in claim 1, wherein said projections are plastically deformed.

5. A seat belt webbing retractor comprising:

a spool around which seat belt webbing is wound, said spool being rotatable about an axis in webbing withdrawal and webbing retraction directions;

a member rotatable in the withdrawal and retraction directions;

means for blocking rotation of said rotatable member and said spool in the withdrawal direction, said spool being rotatable relative to said rotatable member upon the occurrence of tension in the webbing above a predetermined amount;

a deformable member fixed to said rotatable member for absorbing energy during rotation of said spool relative to said rotatable member, said deformable member having an annular projection extending axially and about the axis; and a deformation member fixed for rotation with said spool and rotatable relative to said deformable member about the axis for radially deforming said projection of said deformable member to absorb energy during rotation of said spool and said deformation member relative to said rotatable member and said deformable member.

6. A retractor as set forth in claim 5, wherein said deformation member has a portion located radially inward of said projection and has a deformation portion which deforms said projection radially outward.

7. A retractor as set forth in claim 6, wherein said projection has a notch, said deformation portion is initially located in said notch.

8. A retractor as set forth in claim 5, including a second deformation member, said deformable member having a second annular projection concentric with said first projection, said second deformable member radially deforming said second projection to absorb energy during rotation of said spool and said second deformation member relative to said rotatable member and said deformable member.

9. A retractor as set forth in claim 8, wherein said first deformation member has means for driving said deformation member to rotate.

10. A retractor as set forth in claim 9, wherein said second member is driven to rotate by said first deformation member subsequent to an initial rotation of said first deformation member and an initial deformation of said first projection by said first deformation member.

11. A retractor as set forth in claim 10, wherein said first and second deformation members simultaneously deform said first and second projections, respectively, during a portion of the rotation of the spool relative to said rotatable member and said deformable member.

12. A seat belt webbing retractor comprising:

a spool around which seat belt webbing is wound, said spool being rotatable about an axis in webbing withdrawal and webbing retraction directions;

a member rotatable in the withdrawal and retraction directions;

means for blocking rotation of said rotatable member and said spool in the withdrawal direction, said spool being rotatable relative to said rotatable member upon the occurrence of tension in the webbing above a predetermined amount;

a deformable member for absorbing energy during a plurality of rotations of said spool relative to said rotatable member, said deformable member having a plurality of annular projections; and means for deforming at least one of said projections during each rotation of said spool relative to said rotatable member to absorb energy;

said means for deforming including a hub fixed for rotation with said spool, said hub having a deformation lobe which presses one of said projections radially outward during rotation of said hub relative to said deformable member.

13. A retractor as set forth in claim 12, wherein said one projection has a notch, said deformation lobe is initially located in said notch.

14. A seat belt webbing retractor comprising:

a spool around which seat belt webbing is wound, said spool being rotatable about an axis in webbing withdrawal and webbing retraction directions;

a member rotatable in the withdrawal and retraction directions;

means for blocking rotation of said rotatable member and said spool in the withdrawal direction, said spool being rotatable relative to said rotatable member upon the occurrence of tension in the webbing above a predetermined amount;

a deformable member for absorbing energy during a plurality of rotations of said spool relative to said rotatable member, said deformable member having a plurality of annular projections; and means for deforming at least one of said projections during each rotation of said spool relative to said rotatable member to absorb energy;

said means for deforming including a hub and a ring, said hub deforming one of said projections, and said ring deforming a second of said projections.

15. A retractor as set forth in claim 14, wherein said hub is fixed for rotation with said spool and deforms said one projection during an initial revolution of said hub relative to said deformable member.

16. A retractor as set forth in claim 15, wherein said hub and said ring have portions which engage subsequent to an initial amount of rotation of said hub relative to said deformable member, said ring rotating with said hub and deforming said second projection during rotation of said hub relative to said deformable member subsequent to said portions of said hub and said ring engaging.

17. A retractor as set forth in claim 14, wherein said projections are concentric about the axis, said hub has a portion located radially within said first projection and a portion which engages a radially inner side of said first projection to deform said first projection, said ring has a portion located radially between said first and second projections and a portion which engages a radially inner side of said second projection to deform said second projection.

18. A seat belt webbing retractor comprising:

a spool around which seat belt webbing is wound, said spool being rotatable about an axis in webbing withdrawal and webbing retraction directions;

a member rotatable in the withdrawal and retraction directions;

means for blocking rotation of said rotatable member and said spool in the withdrawal direction, said spool being rotatable relative to said rotatable member upon the occurrence: of tension in the webbing above a predetermined amount;

a deformable member for absorbing energy during a plurality of rotations of said spool relative to said rotatable member, said deformable member having a plurality of annular projections which are concentric about the axis; and means for deforming said projections during rotation of said spool relative to said rotatable member to absorb energy;

said means for deforming including a plurality of deformation members located adjacent to said projections.

19. A retractor as set forth in claim 18, wherein one of said deformation members is fixed for rotation with said spool.

20. A retractor as set forth in claim 19, wherein said one deformation member has means for driving another of said deformation members to rotate subsequent to an initial rotation of said one deformation member.

21. A seat belt webbing retractor comprising:

a spool around which seat belt webbing is wound, said spool being rotatable about an axis in webbing withdrawal and webbing retraction directions;

a member rotatable in the withdrawal and retraction directions;

means for blocking rotation of said rotatable member and said spool in the withdrawal direction, said spool being rotatable relative to said rotatable member upon the occurrence, of tension in the webbing above a predetermined amount;

a deformable member for absorbing energy during a plurality of rotations of said spool relative to said rotatable member, said deformable member having a plurality of annular projections which are concentric about the axis; and means for deforming said projections during rotation of said spool relative to said rotatable member to absorb energy;

said means for deforming including means for deforming said projections radially outward.

* * * * *